United States Patent [19]
Giovanni

[11] Patent Number: 5,841,367
[45] Date of Patent: Nov. 24, 1998

[54] ELECTRONIC EQUIPMENT FOR PREVENTION OF COLLISIONS BETWEEN VEHICLES

[76] Inventor: Caico Giovanni, Via Lama N. 12, P.O. Box 74020, I-74020 Lama, Italy

[21] Appl. No.: 374,391

[22] Filed: Jan. 17, 1995

Related U.S. Application Data

[63] Continuation of Ser. No. 915,735, filed as PCT/IT91/00084, Oct. 9, 1991, abandoned.

[30] Foreign Application Priority Data

Nov. 7, 1990 [IT] Italy ..................... 48453/90

[51] Int. Cl.$^6$ ..................................................... G08G 1/00
[52] U.S. Cl. ...................... 340/903; 340/436; 340/904; 340/989
[58] Field of Search .................... 340/902, 903, 340/904, 225, 436, 988, 991, 989

[56] References Cited

U.S. PATENT DOCUMENTS

| | | | |
|---|---|---|---|
| 3,689,882 | 9/1972 | Dessailly | 340/903 |
| 3,784,394 | 1/1974 | Simpkin | 340/902 |
| 3,824,479 | 7/1974 | Ristenbatt | 342/905 |
| 3,892,483 | 7/1975 | Säufferer | 340/903 |
| 3,949,362 | 4/1976 | Doyle et al. | 340/435 |
| 4,216,545 | 8/1980 | Flickshu et al. | 340/904 |
| 4,369,426 | 1/1983 | Merkel | 340/904 |
| 4,403,208 | 9/1983 | Hodgson et al. | 340/904 |
| 4,706,086 | 11/1987 | Panizza | 340/902 |
| 4,794,394 | 12/1988 | Halstead | 340/903 |
| 5,126,735 | 6/1992 | Trevijano | 340/902 |
| 5,165,497 | 11/1992 | Chi | 340/904 |
| 5,189,619 | 2/1993 | Adachi et al. | 340/903 |
| 5,249,157 | 9/1993 | Taylor | 340/903 |
| 5,289,181 | 2/1994 | Watanabe et al. | 340/902 |
| 5,289,182 | 2/1994 | Brillard et al. | 340/903 |

FOREIGN PATENT DOCUMENTS

| | | |
|---|---|---|
| 0 055 227 | 6/1982 | European Pat. Off. . |
| 1373534 | 11/1974 | United Kingdom . |

OTHER PUBLICATIONS

Haden, Clovis R., "A Student–Designed Automotive Collision Avoidance System," *IEEE Transactions on Vehicular Technology*, vol. VT–27, No. 1, Feb. 1978, pp. 31–34.

*Primary Examiner*—Jeffery Hofsass
*Assistant Examiner*—Edward Lefkowitz

[57] ABSTRACT

An electronic encoder/transmitter encodes acoustic and visual signal pulses for transmission to other vehicles. A device transmits alarm signals instantaneously when the vehicle self collides, becomes blocked in the road, or when the vehicle is on a collision course with another vehicle. The device receives signals from sensors and enters a function to send an encoded radio signal via an antenna. A manual switch may also be used. Signals received by the decoder/receiver may be visualized by colored LEDs placed at a front panel. The transmitted signal is sent to all vehicles driving in the immediate area. The present invention includes acoustic and visible pulses to warn of risks and collisions which may happen in a short distance and not be visible between the vehicles. The present invention also includes an alarm placed on all four sides of the vehicle and connected to an automatic hydroelectric brake system for reducing the speed of the vehicle. An automatic horn is also included, as well as a manual alarm for crossroad proximity.

13 Claims, 6 Drawing Sheets

ELECTRONIC EQUIPMENT FOR PREVENTION OF COLLISIONS BETWEEN VEHICLES

This is a continuation application of Ser. No. 07/915,735, filed as PCT/IT91/00084, Oct. 9, 1991, now abandoned.

TECHNICAL FIELDS OF THE INVENTION

The present invention relates to electronic equipment composed of a large number of microelectronic components. More specifically, the present invention relates to electronic equipment for preventing collisions between vehicles. In an unexpected situation, the present invention analyzes imminent risks at short distances and in a few seconds of time, and transmits immediately information to the other vehicles in the area.

BACKGROUND OF THE INVENTION

In urban and suburban areas, electronic equipment together with particular and appropriate devices, may reduce the risk of collision between vehicles. Along these lines, the present invention has been disclosed and claimed on Nov. 7, 1990, Demand Patent No.—48,453-A90, entitled "Electronic Radio Transmitter for Vehicle With Sound Pulse Visible for Pre-Advice of Danger Collision Which May Happen at Short Distance Where not Visible Between Vehicles and Alarm for Distance of Security To Both Sides And Pre-disposed With Automatic Hydroelectric Brake Systems." The above mentioned document, is on deposit at the MINISTRY OF INDUSTRY AND COMMERCE, Central Patent Office, ROME, ITALY.

SUMMARY OF THE INVENTION

The present invention is assembled with very sophisticated electronic devices for preventing and resolving collisions between vehicles. Electronic equipment, including an encoder and decoder is incorporated into vehicles driven on the roadway. An electronic transmitter incorporated into the device encodes acoustic and visual signal pulses for transmission to other vehicles. A first device is employed to transmit alarm signals instantaneously when the vehicle self collides, becomes blocked in the road, or when the vehicle is on a collision course with another vehicle. A series of sensors are configured to detect an impact between two vehicles with a discrete amount of power. The encoder, contained within the vehicle, receives the signal from the sensors and enters a function to send an encoded radio signal via an antenna about 3,000 to 5,000 meters in distance. To avoid false alarms this same operation may be performed by a manual switch. The switch may be broken in case of emergency for switching to the "on" position. This same operation may be performed by a manual operation (switching to the "on" position). To avoid false alarms, this switch may be broken only once, after which this broken switch needs to be replaced.

An electronic decoder at a remote location may receive both acoustic and visual signal pulses emitted from the distressed vehicle. This receiver is activated at the same moment that the driver inserts the key to start the motor of the vehicle. The present invention will always remain in stand-by position during driving. When another encoder transmitter sends an alarm signal, the receiver will automatically emit an alarm signal if entering in the area of this distressed vehicle or of a collision between vehicles. The decoder, incorporated as part of the receiver, discriminates between pulse signals received, then relays the information in form of acoustic tones through a speaker to the driver. Signals received by the decoder may be visualized by colored LEDs of green, yellow and red placed at a front panel on the dashboard. Each colored LED represents a different distance, for example: a Green LED equals approximately 5,000 to 3,000 meters; a Yellow LED equals approximately 3,000 to 500 meters; and a Red LED equals approximately 500 meters to the point where the collision of blocked-up road condition occurs.

One advantage of the present alarm system is that an instantaneous signal is sent to all vehicles which are driving in the immediate area. Accordingly, all drivers may drive with extra caution, since they are already informed of the potential hazard. Some incidents or collisions between other vehicles, or even a potential chain collision may then be avoided.

However, it is not uncommon for a driver to proceed to a collision area, about 300 meters from the accident point, while remaining at sustained velocity. In this case, the driver may not see the collision due to a shortage of visibility. The accident may be around a corner in the road and out of sight. In this situation, a few seconds of time may be vital. These few seconds of time may allow the driver to visualize the LEDs which are green, yellow and red, and accordingly moderate the velocity of his vehicle. Obviously, if the vehicle is driven in an opposite direction, the LEDs will inform the driver that the vehicle is going farther from the center point of the collision. In a few seconds of time, the signals will attenuate and accordingly, will not provide indication though the LEDs.

The present invention includes acoustic and visual pulses to warn of risks and collisions which may happen in a short distance. The collision need not be visible between the vehicles. The present invention is also equipped with an alarm for security which is placed on all four sides of the vehicle and connected to an automatic hydroelectric brake system.

DETAILED DESCRIPTION OF THE PREFERRED EMBODIMENT

Figure 1:
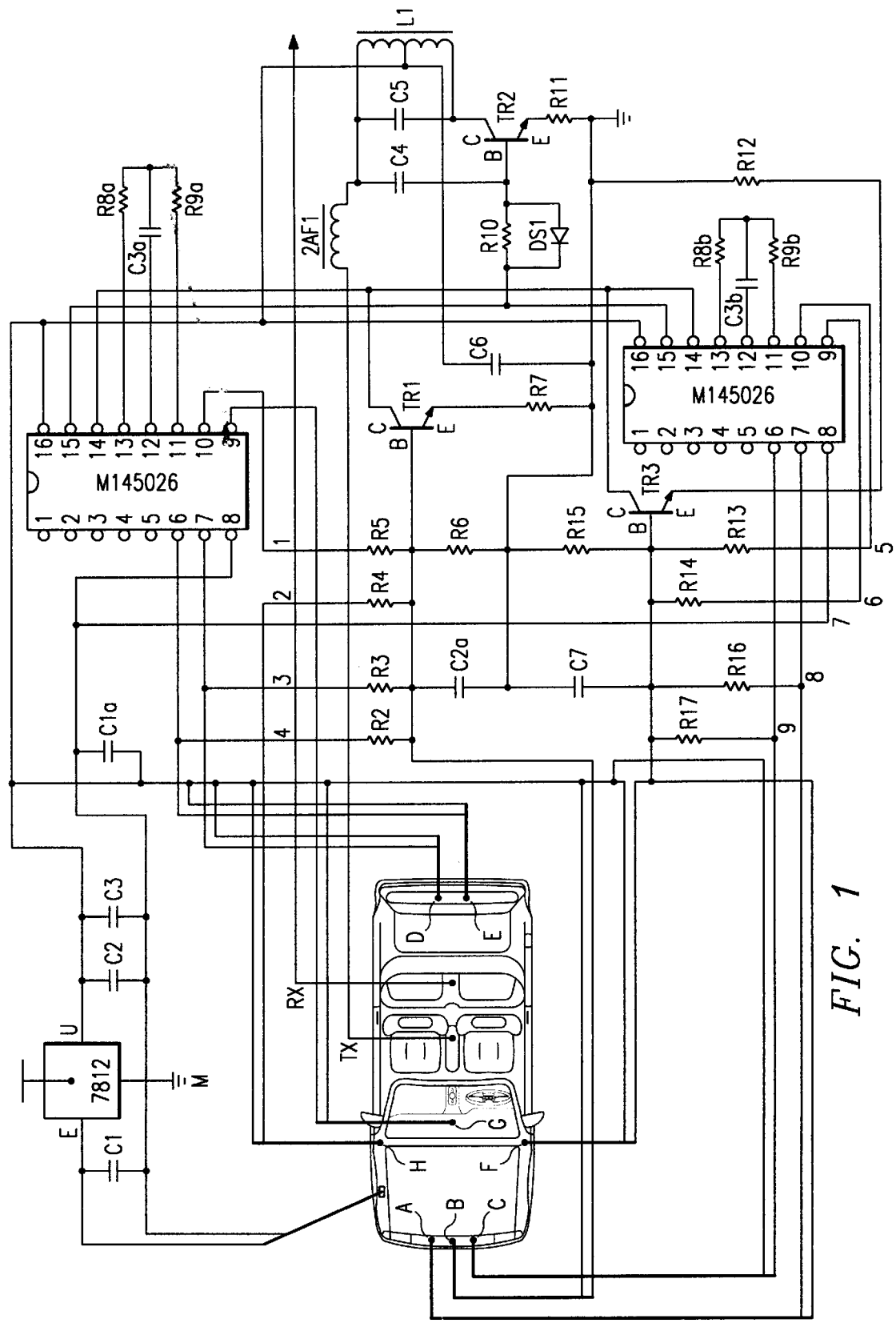
FIG. 1 shows a schematic view of a transmitter section additionally showing relative sensor placement on an automobile.

Referring to the drawings and in particular FIG. 1, a more detailed view of the transmitter section is explained. It should be noted that the electronic devices used for this system may include infrared light cells, microwaves or similar signals. We can resolve many driving problems due to limited visibility since we know this to be one of the biggest causes of collisions.

This equipment, is composed of many electronic components each with differing functions. The components are placed and welded on a circuit board, then arranged inside a hard case. The base plate is made of a hard epoxy fiber glass resin and contains wiring for printed circuit boards to guaranty maximum security in case of impact between vehicles. The hard case has a front panel with LEDs for visualization and devices for acoustic tonality.

The present invention will activate as it recognizes conditions of limited visibility, e.g. intense rain, fog, a tunnel, or darkness. Then it will remain in stand-by position. As the vehicle approaches a maximum distance from another vehicle which is predetermined for driver safety, the device automatically activates an alarm function producing acoustic bi-tonal sounds. The device emits different alarm tones from those when a collision happens. In this instant, a blue LED is lit on the dashboard. A small red blinking light lamp placed at a rearward point outside of the vehicle and provides an indication to those vehicles not yet equipped with these devices. At the same time, a driver receiving this alarm signal may be assured that another vehicle is driving the same way and has similar equipment by referencing the front of the other vehicle. A driver, recognizing the approaching vehicle could immediately reduce the velocity of his vehicle and keep away from the collision point, thereby stopping the alarm. If conditions permit the driver to make a turn, he may simply insert an indication of direction change into the device and the alarm will automatically stop. Having already made the turn and not finding any other vehicle in the immediate vicinity, the alarm will stop and automatically reset to the stand-by position.

Anytime a vehicle approaches close enough to another vehicle, in side by side relation, there is a risk of collision. In this case, an alarm will sound to each vehicle equipped with the device and also visually illuminate the blue LED light placed on the dashboard of the equipment. The alarm may be turned off at any time through a push button placed at a front dashboard panel. This may be useful in an urban area where the vehicle may routinely encounter a large amount of traffic. Devices according to the present invention resolve the problems of collision in most cases involving driving safety.

The present invention may also slow the velocity of the vehicle or apply the brake. For this point, referring to FIG. 1 and FIG. 2, a predisposed circuit relay is connected in parallel with the device for determining safe distance as explained in FIG. 3. At the moment the device receives a pulse voltage from the 12 volt battery, a switch on a hydroelectric pump operates as a closed circuit. This operates to open or close the electrovalve utilized for the brake systems. Note that this predisposition system could be very useful to the drivers in an emergency situation. Fortunately, as a result of this above-mentioned system, it is very easy to arrive at a new invention, as follows: 1. Prevent and solve collisions in close proximity to other vehicles; 2. Automatically communicate driving lights and anti-collision lights between two vehicles; and 3. Serve as a substitute for the use of a horn. This device is particularly useful for resolving the problems of excessive noise caused by horns in urban areas.

The present device may serve as an alarm for vehicles in close proximity. This alarm can be used on this equipment as shown and described in reference to FIG. 1 and FIG. 2. A manual push button switches the encoder/transmitter to send signals in the form of radio waves to the decoder/receiver. The device is designed for a 200 meter range. Upon receiving a signal, the device activates a buzzer (sound producing oscillator) together with a small speaker and also two LEDs of yellow and red as visual indicators. The LEDs indicate the distance in meters, respectively. The advantage thus obtained consists in sending one of the signals a distance where it is very difficult to observe other vehicles in close proximity.

If we think that each driver is driving in the frontal direction, without any minimum attention, we may better determine in what circumstances a risk should happen. It is known that in certain circumstances, at some particular time, either in intense urban traffic or on a suburban road, many drivers ignore the hidden risks of crossing vehicles without observing a minimum amount of attention. In addition, frontal collisions may happen between vehicles because of distress or lack of attention from the person driving. To counter these problems this new alarm device indicates the proximity of other vehicles. Two LEDs of yellow and red are illuminated for 200 meters and 50 meters, respectively. This provides the possibility of avoiding a collision. It should be noted that if the received signal is from the opposite direction, the alarm will stop in a few seconds.

The present invention also provides an automatic alarm as a push button device for controlling the driving lights and the "bright" lights. This particular device uses photocells. The photocells excite a relay that automatically changes the voltage position of driving lights in a distance of about 200 meters. Accordingly, the driver of a vehicle will not be disturbed from the bright lights of another. This should help individuals conform to laws that prohibit driving with bright lights.

Figure 2A:
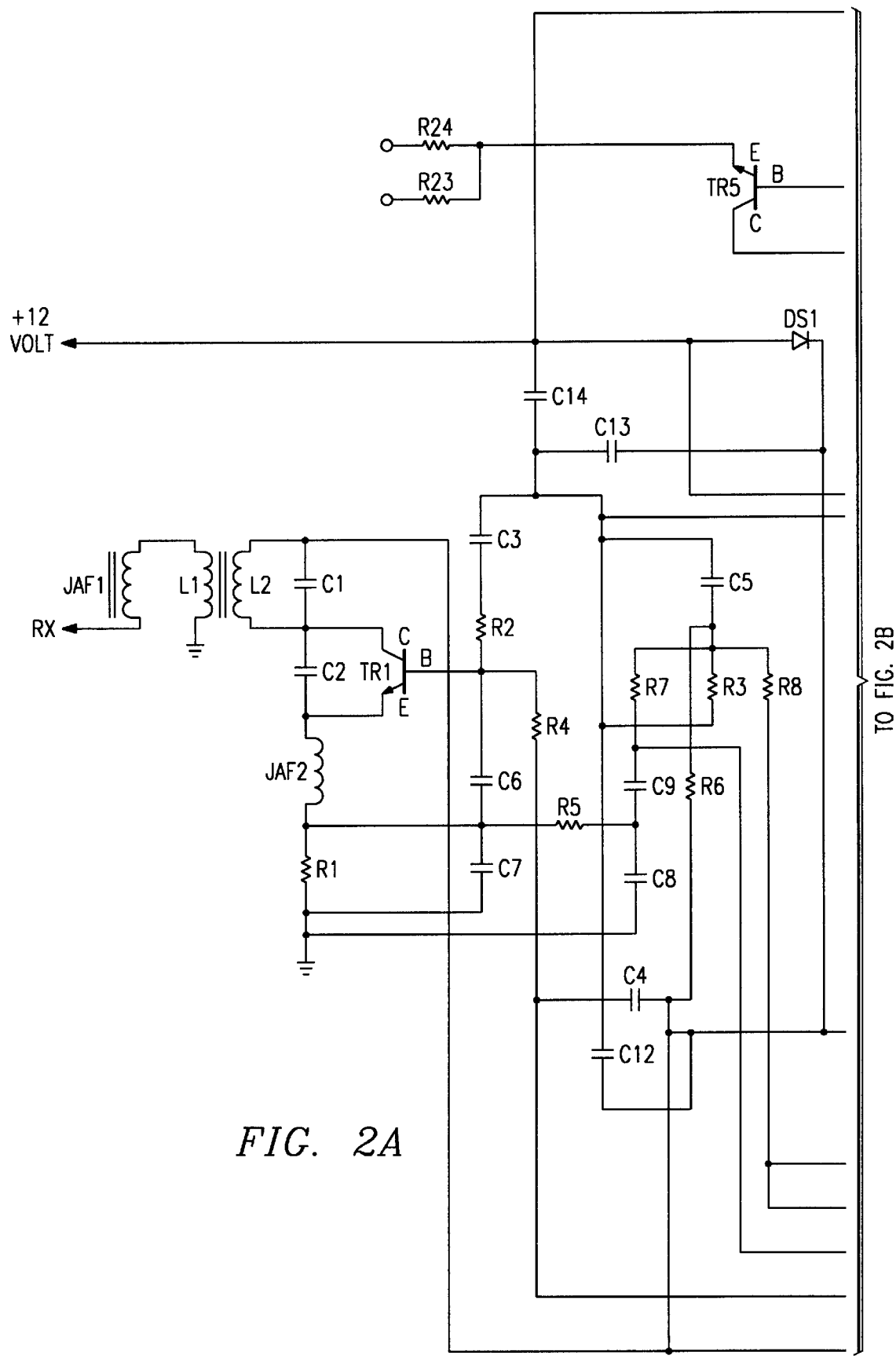
FIG. 2 shows a schematic view of a receiver section according to the present invention.
Figure 2B:
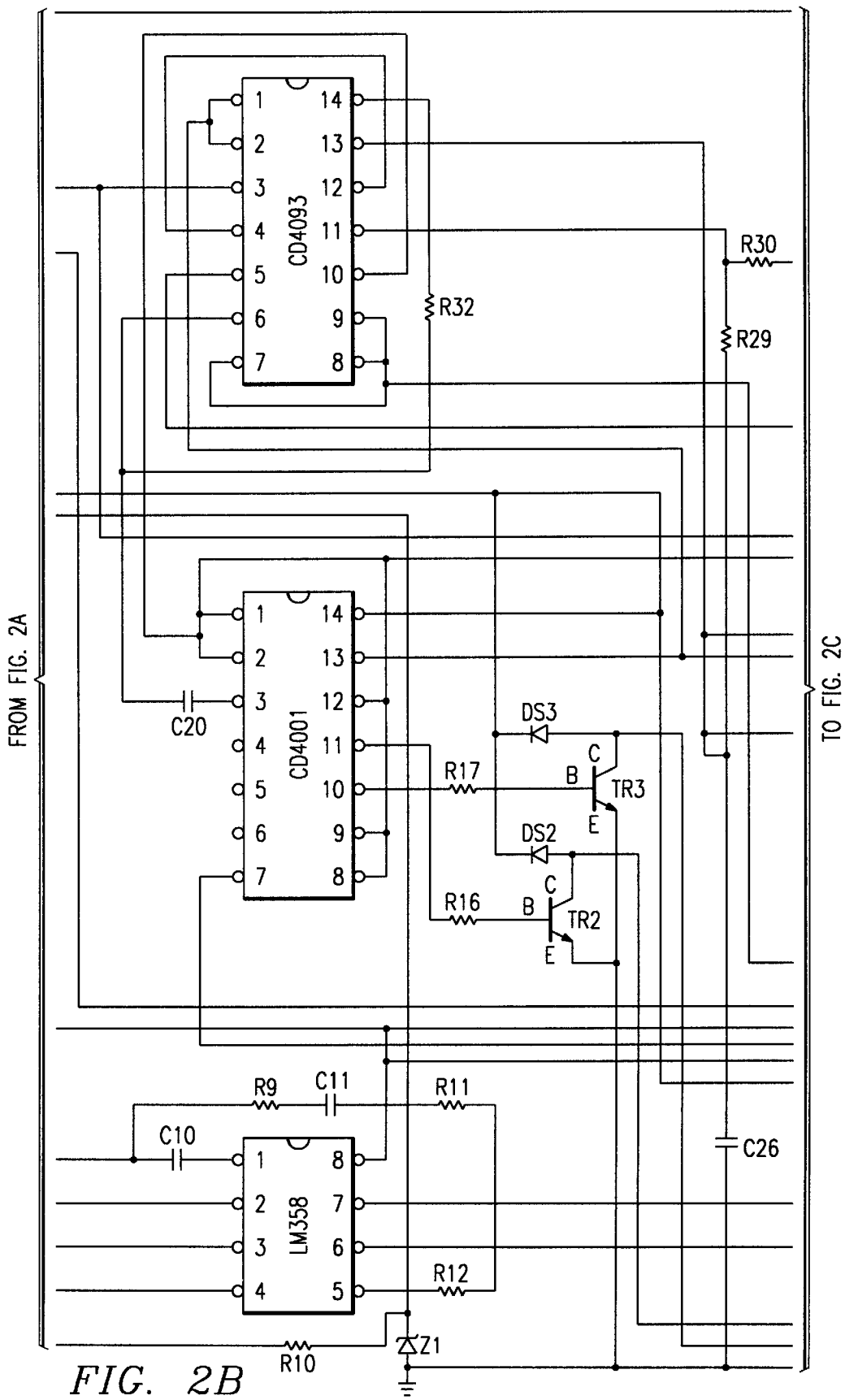
Figure 2C:
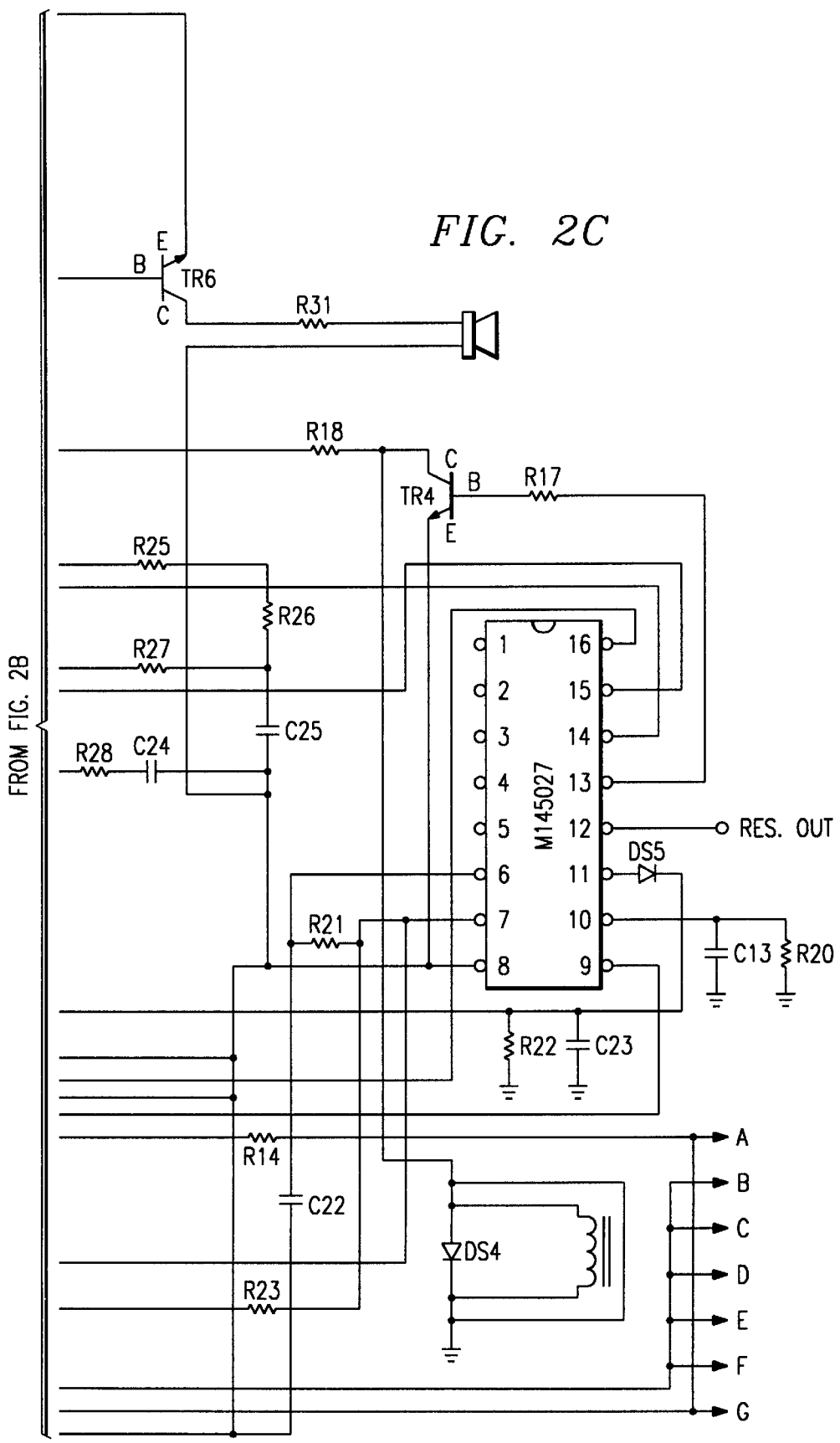

The horn as shown and described with reference to FIG. 1 and FIG. 2, is composed of a push button device that operates the encoder section to send an encoded radio signal to a receiver. At the same time, the device actuates an oscillator to produce an acoustic sound reproduced by a buzzer or small speaker. The signal may also be visualized by LEDs of violet or other colors to indicate the received signal (with or without use of the speaker). The advantages obtained by this invention substitute for the old horn system to silence and resolve noise problems in all areas. Furthermore, the present invention can be used to replace the normal classic horn by a buzzer to warn pedestrians in urban areas. This invention is shown with more detail in the accompanying schematic diagrams to assist in a better understanding of those functions.

Figure 3A:
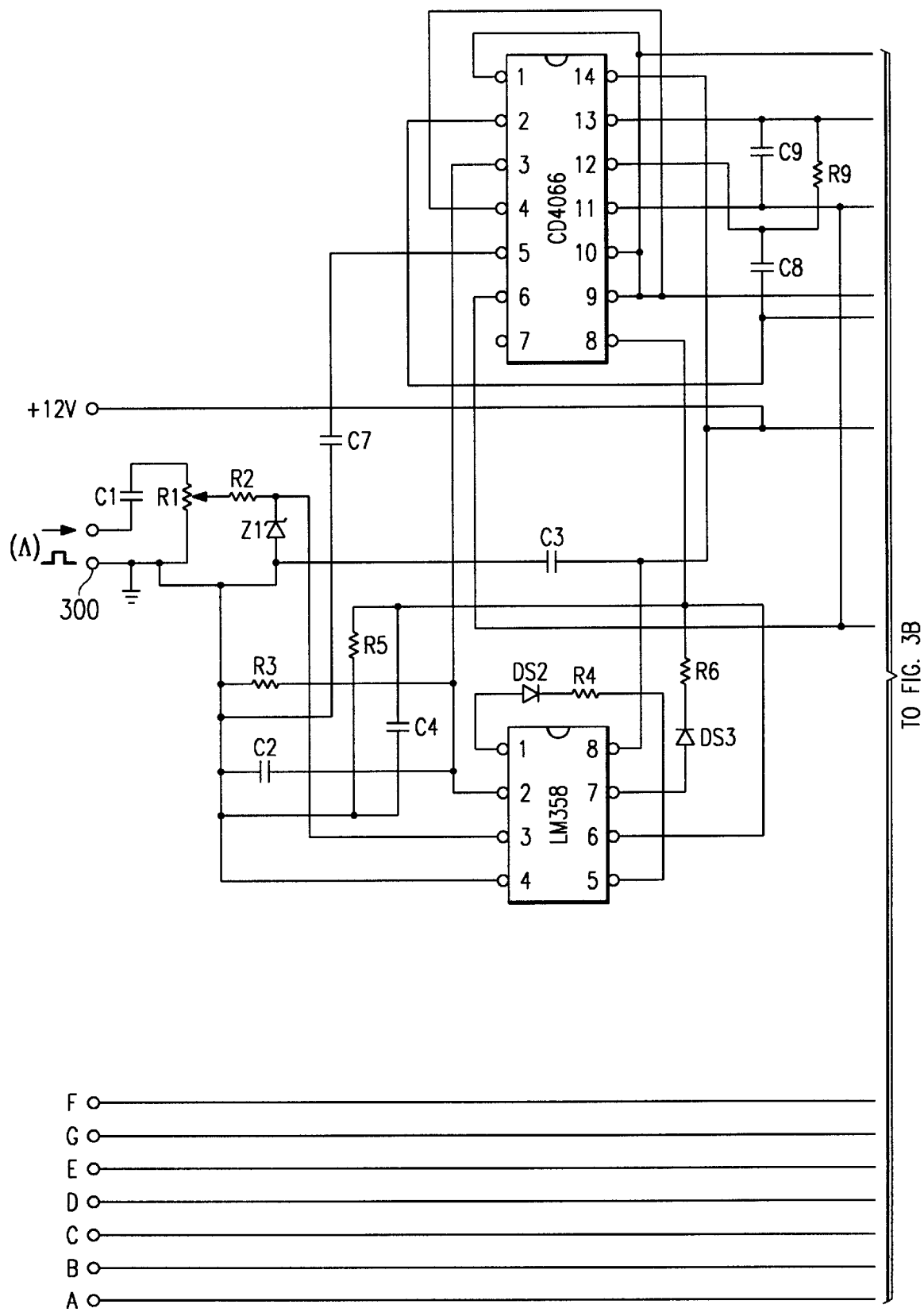
FIG. 3 shows a schematic view of output circuitry which may be used to drive the indication means of the present invention.
Figure 3B:
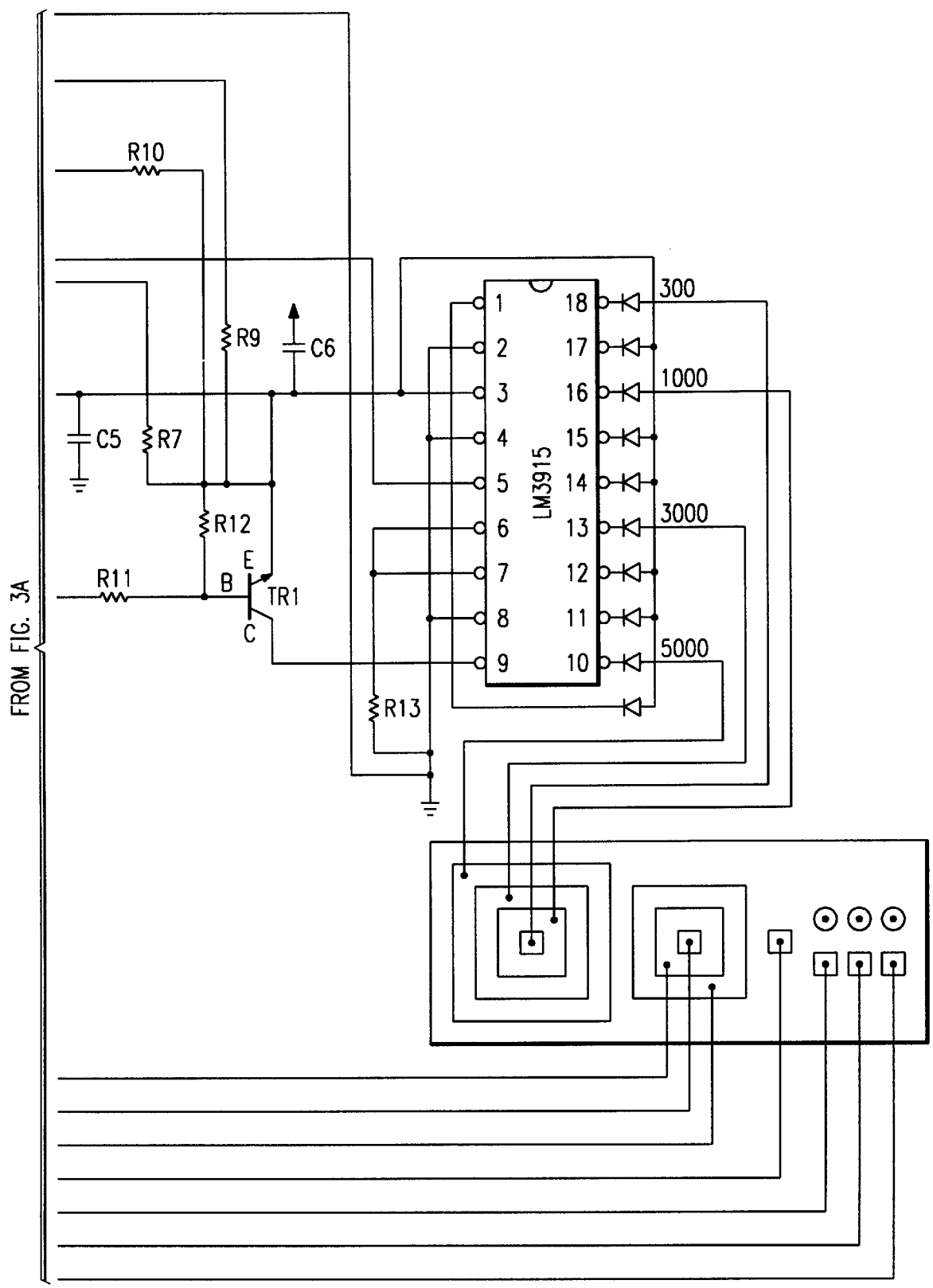

Reference is now made to the encoder/transmitter as shown in FIG. 1. It should be noted that the FIGS. 1–3 are further divided into sections 1–6 to better convey the invention. To make this equipment operate as a radio signal receiver/transmitter, it is necessary to build a sophisticated electronic circuit. The present invention avoids sending one command signal in a state of alarm and does not activate another function alarm. By consequence, this transmitter not only functions by sending radio frequency signals, but also sends encoded pulse signals that only a decoder will be able to recognize.

The encoder and decoder are two integrated circuits (IC's) which employ as sensor signals: infrared light rays, microwaves, or similar signals used for distance measurement between vehicles. The encoder, which in the illustrated embodiment is a Motorola M145026, is composed internally by five blocks (not shown) as follows: 1. A 3-pin low-frequency oscillator and enable block; 2. ÷4 divider; 3. Ring counter and 1-of-9 decoder; 4. Trinary detector; and 5. Data select and buffer. The oscillator maintains a low frequency to obtain a square wave signal in which the frequency is determined by the values of resistances R8 and R9 and by the capacitor C3. They are connected with pins 11, 12 and 13 of the encoder M145026 as shown. Note that by varying with the values of the resistances and we are able to vary the working frequency of this transmitter.

It is clear that to operate this oscillator it is necessary to connect transmit enable pin 14 of the encoder to the ground system through the collector-emitter current path of bipolar transistor TR3. Bipolar transistor TR3 acts as an alarm generator. The output of the encoder is effectuated at data out pin 15 where a series of address pulses that comprise the encoded signal are present. This is followed by another pulse signal, that forms the pulse command or data signal. Note that this transmitter is connected with the output filter circuit of the regulated 12 volt power supply 7812 by a capacitor C2 with ground. The encoded signal is made up of a series of small and large pulses, which should be decoded by the receiver section (FIG. 2) then further distributed.

Referring to FIG. 2, the receiver is composed of one decoder, in the illustrated embodiment a Motorola M145027, which has shown internally with 4 principal blocks: 1. A data extractor; 2. A comparator; 3. An address sequencer circuit; and 4. An output latch. The data extractor is employed here in order to extract from the input signal appearing at input pin 9 of decoder M145027, an address that is composed of a first series of pulses. To obtain this result, the message is contained within the signal of the square wave, of same frequency, utilized by the transmitter. For this condition, pins 6 and 7 should be connected to resistor R21 and the capacitor C22 as shown.

After the series of address pulses is received, which is followed by the command or data pulse, there is recognized at pin 10 of the decoder M145027 a resistor R20 and capacitor C13 connected thereto, which are used by decoder M145027 to detect the end of an encoded word and the end of transmission, and which are of predetermined values. Once the decoder state is entered, the device will then recognize the address pulses. At this point, the logic comparator enables the output latch to receive the data.

However, at the same time at pin 11 of the decoder M145027, a valid transmission (VT) output goes high to confirm that the address is recognized. Note that prior to this time all outputs (pins 12–15) of this output latch are at logic "0" with no signal. Any time that one of the sensors (FIG. 7) short circuits, the decoder M145027 automatically outputs, on the relevant output, a logic "1", or a positive "1". But, if the decoder does not recognize the address pulses, the state of the output pins 12, 13, 14, and 15 of the decoder will not be modified. Of course, this assures the complete adaptability of the apparatus.

FIGS. 1 and 2 represent the electronic schematic diagram realized as the present invention. The relative sections of the total blocks function as follows. Section 1 comprises essentially the position of all relative sensors, photocells and antennas. Relating to FIGS. 1 and 2, the sensors for collision regulate for impact at a minimal speed of about 30 Km. Photocells 3 communicate bright light information. Photocells 7 are used for short visibility distance and in fog and rain, etc. Photocells 4, 5 and 6 or even microwaves may be used for determining distance. Antennas transmitter 9, antenna receiver 10, and regulated power supply 11 are also shown.

Section 2 consists of a circuit for charging the battery and for maintaining constant power supplemental to the battery charge.

Section 3 comprises an encoder/transmitter. This encoder is an integrated circuit (IC) M-145026 having 3 principal blocks: 1. A low-frequency oscillator and enable circuit; 2. ÷4 divider; 3. Ring counter and 1-of-9 decoder; 4. Trinary detector; and 5. Data select and buffer. The encoder M145026, manufactured by Motorola, is the heart of the transmitter. A transmit enable (TE) pin 14 of the lower encoder M145026 is connected to the collector of bipolar transistor TR3, whose emitter is connected to ground through resistor R12. A base B of transistor TR3 is connected to sensor A on the front of the automobile. Data input pins 6 and 7 of the lower M145026 encoder are, respectively, connected to sensors A and C on the front of the automobile.

Transmit enable (TE) pin 14 of the upper (as located in FIG. 1) encoder M145026 is connected in parallel to the collectors of transistors TR1 and TR3 (as is the transmit enable pin 14 of the lower encoder). A base B of bipolar transistor TR1 is connected to sensor B on the front of the automobile. Data input pins 6 and 7 of the upper encoder M145026 are connected, respectively, to sensors E and D on the rear of the automobile. Data input pin 9 of the upper encoder M145026 is connected to point G on the automobile dash, while data input pin 10 of upper encoder M145026 is connected to sensor H on the right hand side of the vehicle. Data inputs 9 and 10 of the lower encoder M145026 are connected to the base B of transistor TR3 through resistors R13 and R14, respectively. Base B of transistor TR3 is also connected to sensor F on the left hand side of the vehicle. Each of the sensors and points A–H receive conditioned power from output U of power supply integrated circuit 7812. Output U of power supply 7812 is also connected to the $V_{DD}$ pins 16 of the upper and lower encoders M145026. It has the function to transmit, via the antenna TX, encoded pulsed radio waves that constitute the address recognition (acknowledgement) and the data pulse or command. Data out pin 15 of encoder M145026 is coupled to transmitter antenna line TX through a transmitter circuit including resistors R10 and R11, diode DS1, capacitors C4–C6, inductors 2AF1 and L1 and bipolar transistor TR2.

Section 4 comprises the decoder/receiver. This decoder is an IC M-145027, manufactured by Motorola and composed of 4 principal blocks: 1. A data extractor; 2. A comparator; 3. An address sequencer circuit; and 4. An output latch. This section represents the most important function blocks of the receiver and is built with two integrated circuits, NAND-CD-4001 and NOR-CD-4093, both manufactured by National Semiconductor. The IC's are formed by a series of transistors which allow an affordable function circuit.

The M145027 chip is manufactured by Motorola. Pin 9 of the M145027 chip receives an input signal from winding L2 of transformer L1/L2, and this signal is sent to a data extractor of the M145027 chip (not shown). Pins 6 and 7 are connected to a resistor R21 and a capacitor C22, and the values of these components are used by the data extractor to determine whether a narrow pulse or a wide pulse has been received. Once chip M145027 is satisfied that a correct data word has been received, the last 4 bits of the word will appear on output pins D6–D9 (pins 15-12) and pin 11, the valid transmission (VT) output pin will go high. Pin 11 of the decoder chip is connected to input pins 8 and 9 of multiple NAND chip CD4093.

Integrated circuit LM358 is a dual low-power operational amplifier manufactured by Motorola. Pins 2 and 3 are inputs to one of the two op amps on chip LM358, while pins 5 and 6 are inputs to the other op amp forming a portion of this chip, the output of which appears on pin 7. Input pin 3 is connected to a node between resistor R7 and capacitor C9 in the receiver section. Data-in pin 9 of decoder M145027 is connected to op amp LM358.

Section 5 of the circuit is realized with an integrated circuit, LM-3915, an LED dot/bar display driver manufactured by Motorola, connected together with 2 (IC) integrated circuits, CD-4066, a quad bilateral switch manufactured by National Semiconductor, and LM 358, a further dual low-power operational amplifier of the kind above described.

Input pin 3 of op amp LM358 is connected through diode Z1 to a node 300. An output pin 1 of op amp LM358 is associated with input pin 3. This pin 1 is connected as an input to input pin 5 of chip LM358, which serves as an input to the other amplifier on this chip. Output pin 7 is associated with input pin 5, and is connected via resistor R6 and diode DS 3 to an input pin 8 of quad switch CD 4066.

The input on pin 8 of CD4066 will selectively appear on pin 9 thereof, according to the state of control pin 6. Pin 9 of switch CD4066 is in turn connected to signal pin 5 of display driver LM3915. The IC's are built on the circuit to withdraw the visualization command as follows: 1. Indicator function; 2. The collision or block-up road; 3. Frontal security distance; 4. Lateral security distance; 5. Distance of proximity; 6. Electronic horn; 7. Control LEDs indicating short visibility. In relay 1, the function is to exchange the power of the "bright" lights from the vehicle. Relay 2 predisposes the automatic hydroelectric brake.

Section 6 is represented as the final part of this circuit and is placed at the front of the dashboard to allow the drivers to visualize the different functions. This circuit is composed of acoustic signal functions via miniature speakers, buzzers, and LEDs coupled for relative security in the device.

While a specific embodiment of the present invention has been described, it should be appreciated that this embodiment was described for purposes of illustration only, without any intention of limiting the scope of the present invention which is defined by the following claims.

I claim:

1. An early detection and collision avoidance system for providing communication between a first vehicle and a plurality of vehicles comprising:

at least one impact sensor mounted on the first vehicle which detects an impact between the first vehicle and an object, said at least one impact sensor producing an impact signal in response thereto;

an alarm signal generator mounted on the first vehicle and connected to said at least one impact sensor for generating an alarm signal in response to the impact signal produced by the impact sensor; and a transmitter mounted on the first vehicle and connected to the alarm signal generator for transmitting a transmitter alarm signal in response to receiving said alarm signal generated by the alarm signal generator, said transmitter alarm signal being transmitted to the plurality of vehicles;

wherein each respective vehicle of the plurality of vehicles includes:

a receiver for receiving the transmitter alarm signal generated by the transmitter; and a proximity detector connected to the receiver for determining the distance between the first vehicle and the plurality of vehicles.

2. The system according to claim 1, further comprising an encoder connected between the alarm signal generator and the transmitter for encoding the transmitter alarm signal prior to transmission.

3. The system according to claim 1, wherein each respective vehicle of the plurality of vehicles includes a respective signal generator, each signal generator generating a second alarm signal if the proximity detected by the proximity detector is below a predetermined value.

4. The system according to claim 3, the proximity detector further comprising:

lateral sensing means for detecting the proximity of objects lateral to the vehicle; and longitudinal sensing means for detecting the proximity of objects longitudinal to the vehicle.

5. The system according to claim 1, further comprising automatic activation means for activating the impact sensor and the proximity detector in response to limited visibility about the vehicle.

6. The system according to claim 1 further comprising means connected to the alarm signal generator for generating a visual signal in response to the alarm signal generated by the alarm signal generator.

7. The system according to claim 6 wherein the means for generating a visual signal includes a plurality of color coded lights disposed within the interior of the vehicle.

8. The system according to claim 6, wherein the means for generating a visual signal includes a first plurality of lights disposed about the exterior periphery of the vehicle and a second plurality of lights disposed about the signal generator, said first and second plurality of lights activated when the proximity detector detects a predetermined distance.

9. The mechanism according to claim 1 further comprising means connected to the alarm signal generator for generating an audible signal in response to the alarm signal generated by the alarm signal generator.

10. The system according to claim 1, wherein the vehicle includes brakes for reducing the velocity of the vehicle, said system further comprising brake activation means for activating the brakes of the vehicle in response to the alarm signal emitted by the impact sensor.

11. The system according to claim 1, wherein the each respective vehicle includes bright driving lights and regular driving lights, and further including:

light detection means for detecting bright light emitted from the oncoming vehicle and emitting a light detection signal in response thereto to the oncoming vehicle; and bright light reduction means for reducing the intensity of the bright driving lights in response to the light detection signal emitted from the light detection means of the oncoming vehicle.

12. The system according to claim 1, further comprising a manually operated horn signalling device, wherein the alarm signal generator generates an encoded radio signal in response to a horn signal of the manually operated horn signaling device and the transmitter of the first vehicle transmits the encoded radio signal generated by the signal generator to the receiver of the each respective vehicle which is within a predetermined distance.

13. The system according to claim 12, wherein the receiver of the each respective vehicle receives the encoded signal generated by the manually operated horn signaling device of the first vehicle, and further comprising means for emitting a horn distress signal interior of the each respective vehicle in response thereto.

\* \* \* \* \*